United States Patent [19]

Frierdich

[11] 4,410,848
[45] Oct. 18, 1983

[54] SYSTEM FOR MAINTAINING EXCITATION OF AN ALTERNATOR DURING EXCESSIVE OUTPUT CURRENT CONDITIONS

[75] Inventor: Waldo J. Frierdich, Highland, Ill.
[73] Assignee: Basler Electric Company, Highland, Ill.
[21] Appl. No.: 271,657
[22] Filed: Jun. 8, 1981
[51] Int. Cl.³ .......................... H02P 9/00; H02H 7/06
[52] U.S. Cl. .................................. 322/25; 322/27; 322/32; 322/97; 324/127; 336/175; 361/20
[58] Field of Search ...................... 322/17, 25, 27, 28, 322/29, 32, 59, 97; 324/127; 336/175; 361/20

[56] References Cited

U.S. PATENT DOCUMENTS

| | | | |
|---|---|---|---|
| 3,316,479 | 4/1967 | Frierdich | 322/27 X |
| 3,546,565 | 12/1970 | Downing, Jr. et al. | 324/127 X |
| 3,899,731 | 8/1975 | Smith | 322/27 X |
| 4,032,835 | 6/1977 | Finnell et al. | 322/59 X |
| 4,044,296 | 8/1977 | Dhyanchand et al. | 322/20 X |
| 4,264,856 | 4/1981 | Frierdich et al. | 322/27 X |
| 4,344,027 | 8/1982 | Karlicek | 322/97 X |

Primary Examiner—R. J. Hickey
Attorney, Agent, or Firm—Senniger, Powers, Leavitt and Roedel

[57] ABSTRACT

A system for supplying power to a field winding to maintain excitation of an alternating current generator during excessive output current conditions, the generator having a plurality of output lines for supplying power to a load and the field winding being supplied during normal operating conditions by a shunt type voltage regulator responsive to the output voltage of the generator. The system includes a current transformer having a primary winding in series with an output line of the generator, a secondary winding, and a tertiary winding shunted by a capacitance. A rectifier circuit rectifies the voltage supplied by the secondary winding, the output terminals of the rectifier circuit being connected in series with the regulator output terminals to supply power to the field winding. A control circuit, connected to the output of the generator and responsive to output current conditions enables the rectifier circuit output during excessive output conditions. Power from the rectifier circuit is supplied to the field winding only when an excessive output current condition exists. Additional circuitry prevents the enabling of the rectifier output if a decrease in generator voltage is accompanied by a decrease in generator frequency which substantially corresponds to a desired response of the voltage regulator. Another circuit disables the voltage regulator when the currents in the output lines of a multi-phase generator are not substantially equal during excessive output current conditions.

32 Claims, 8 Drawing Figures

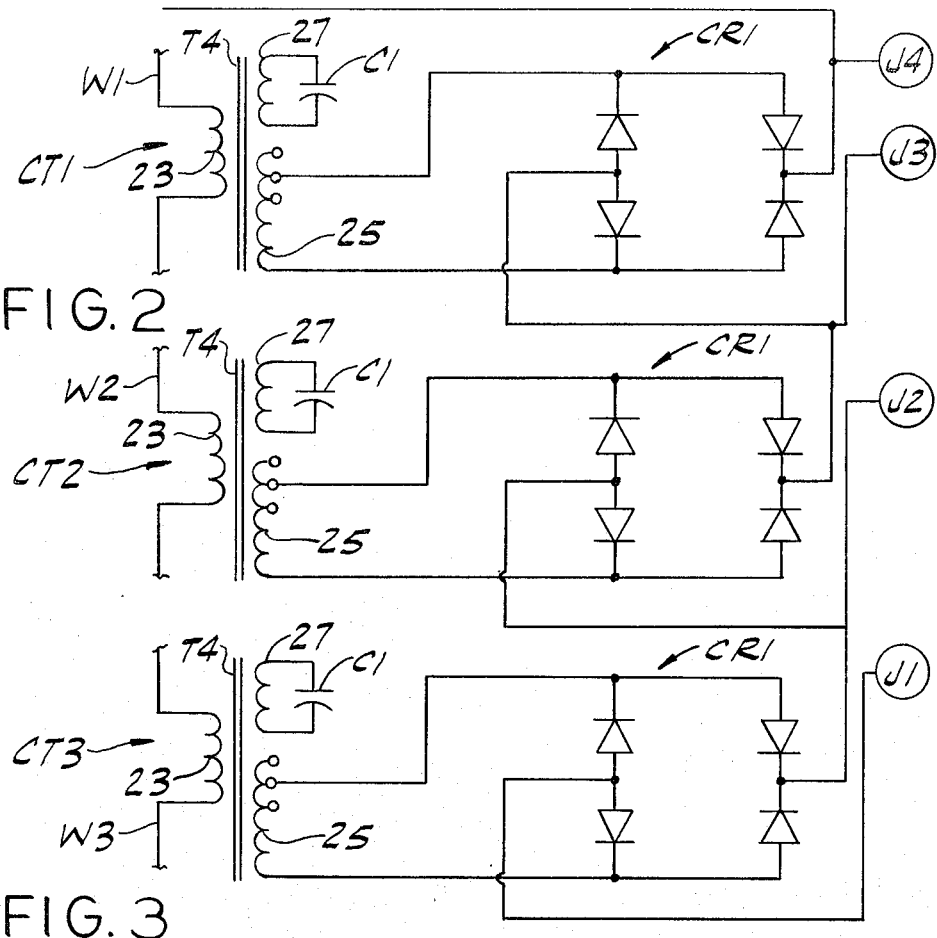
FIG. 2
FIG. 3
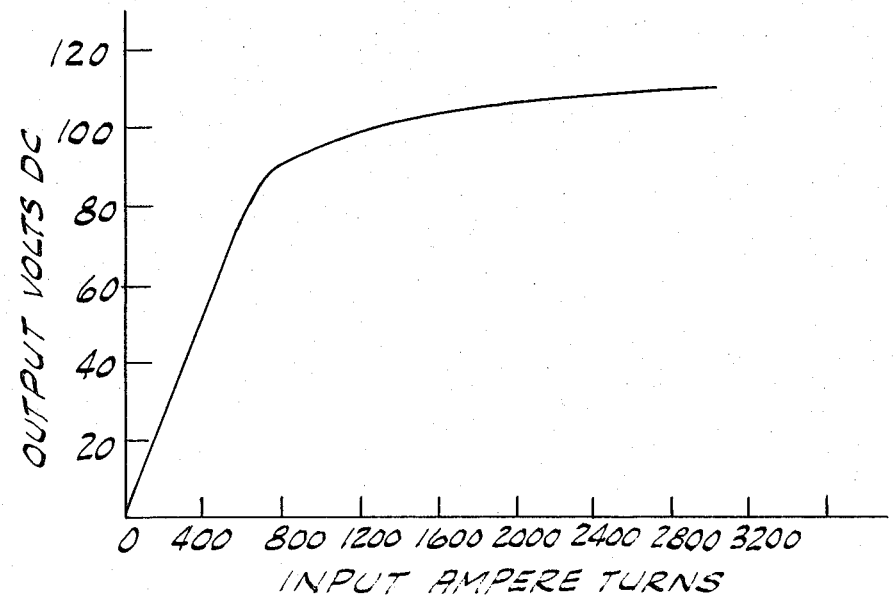

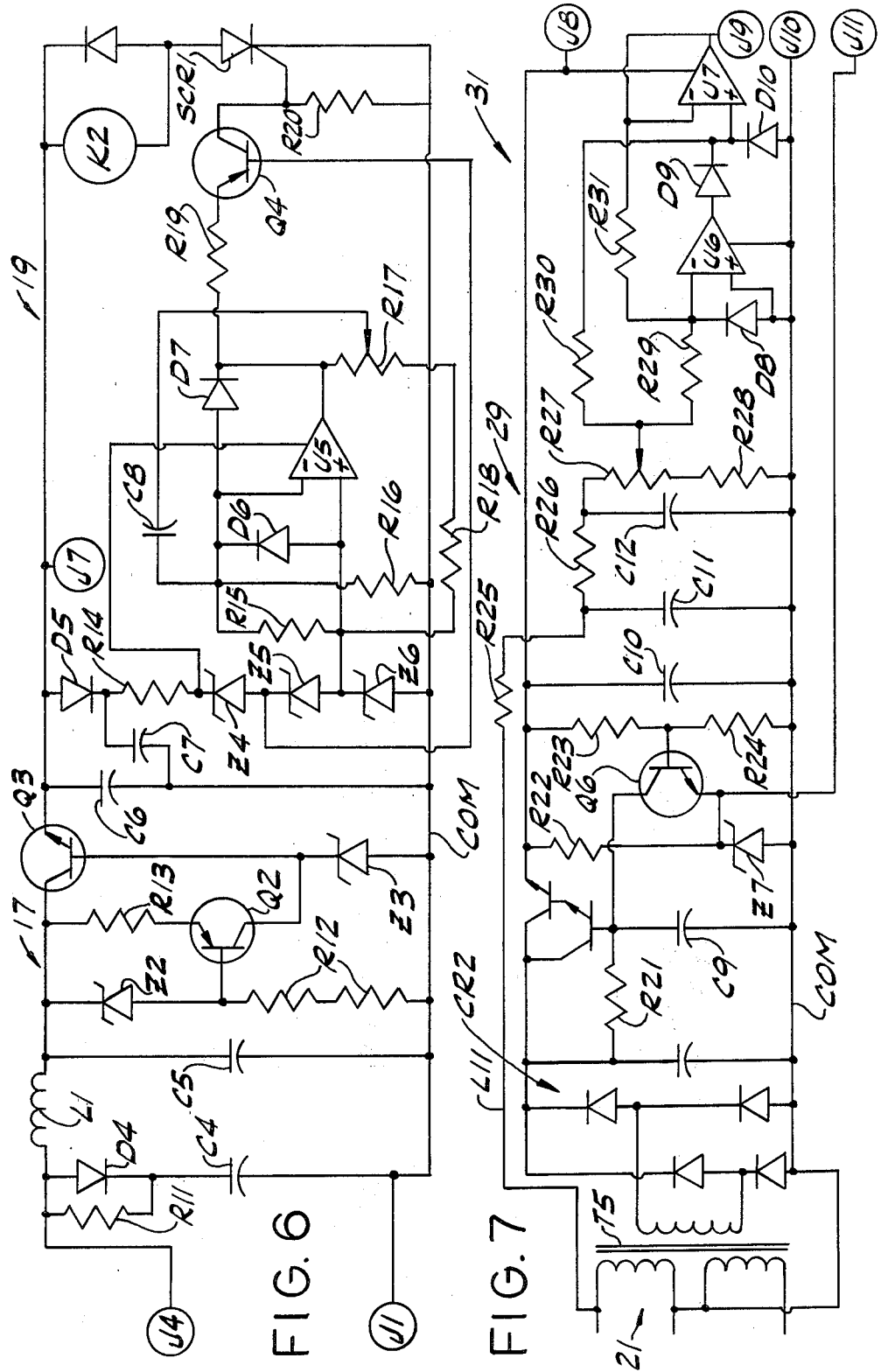

SYSTEM FOR MAINTAINING EXCITATION OF AN ALTERNATOR DURING EXCESSIVE OUTPUT CURRENT CONDITIONS

BACKGROUND OF THE INVENTION

This invention relates to systems for maintaining the excitation of a field winding of alternating current generator (alternator), and more particularly to systems for maintaining said excitation during excessive output current conditions.

The voltage and current for the field winding of an alternator is often provided by a shunt-connected, automatic voltage regulator (AVR). Such a regulator receives its power from the alternator and in turn supplies power either directly to the alternator's field winding or to the field winding of an exciter. In the latter case the output of the exciter is in turn supplied to the alternator's field winding. The power supplied by the AVR is a function of the generator output voltage and, sometimes, the generator frequency. Under excessive output current conditions of the generator (such as a fault or overload on one or more generator output lines) the output voltage of the generator drops severely. Ideally, it is desirable for the generator to maintain a short circuit current of about three times rated full load current for at least a time interval sufficient for circuit breakers to clear faults on the lines. Although the regulator attempts to increase the excitation of the field winding under these conditions to provide the desired short circuit current, the low voltage on the generator output lines often results in insufficient power being supplied to the voltage regulator. Consequently the field excitation actually drops and the generator output collapses. A related problem with shunt-regulated alternators occurs during motor starting operations. During motor starting the output voltage of the alternator falls, which lenghtens the amount of time required to start the motor.

To prevent collapse of the generator output, regulating systems which supplement or boost the automatic voltage regulator under excessive output current conditions have been developed, including that disclosed in U.S. Pat. No. 3,316,479. The system of that patent uses a saturable transformer having a primary winding connected in series with an output line of the generator (see FIG. 1, transformer 16). The output of the secondary of said transformer is supplied to a voltage regulator (regulator R1), said output of the secondary being a continuous source of power for the regulator during excessive output current conditions (see col. 3, lines 9-43). The saturable transformer is designed to limit the effective supplemental voltage supplied to the regulator. However, expensive high voltage rectifiers are used with the system of that patent and, in general, with systems which use saturable transformers to limit the supplemental voltage.

Reference is also made to copending U.S. patent application Ser. No. 22,961, filed Mar. 23, 1979, now U.S. Pat. No. 4,264,856, which discloses a system for maintaining the excitation of an alternating current generator during excessive output current conditions. The system has booster stages each of which utilizes a current transformer to develop a voltage from the current in a respective generator output line. During excessive output current conditions, a sensing circuit causes the booster stages to impress their generated voltages upon the generator field winding. The power supplied by the booster stages is supplemental to that supplied by the regulator.

Prior art three-phase generator regulators which receive power from only one line-to-line phase of the generator, such as shown in the above-mentioned application Ser. No. 22,961, now U.S. Pat. No. 4,264,856, have an output voltage which is unpredictable under excessive output current conditions because its output voltage is determined by the current and voltage in only the particular line-to-line phase from which it receives power. For example, a short in the line-to-line phase from which the regulator receives its power will reduce the regulator output drastically while a similar short in a different line-to-line phase may result in little or no change in regulator output. Therefore, regulator output is an unknown, which fact makes it difficult for an excitation maintaining, or boost, system used in conjunction with such a regulator to supply the proper field excitation power. This problem is compounded by the fact that different fault conditions (line-to-line shorts, line-to-neutral shorts, three-phase shorts) require different field excitations. It is desirable that the boost system supplement the excitation the required amount to provide the desired short-circuit current regardless of the generator phase affected and regardless of the particular fault condition.

Many automatic voltage regulators have a frequency responsive transfer characteristic. If the prime mover slows and the generator frequency thereby decreases, the regulator as a protective measure decreases the field winding excitation to decrease the generator output voltage. Such a decrease in generator voltage may be treated as a fault or overload and boost the field, thereby defeating the protection afforded by the regulator.

SUMMARY OF THE INVENTION

Among the several objects of this invention may be noted the provision of an improved system (sometimes referred to herein as a boost system) for maintaining excitation of an alternator during excessive output current conditions; the provision of such a system that does not require the use of expensive, high voltage rectifiers; the provision of such a system, for use with a multi-phase generator and a voltage regulator receiving power from only one line-to-line phase of the generator, which maintains the desired current level during excessive output conditions of the generator regardless of which generator phases are affected; the provision of a boost system which provides the proper field excitation regardless of the particular fault condition; the provision of such a system which does not interfere with the protection afforded the generator by a voltage regulator having a frequency-responsive transfer characteristic; the provision of such a system which also improves the dynamic performance of the generator during motor starting operations; and the provision of a boost system which is relatively inexpensive, reliable and simple in construction.

Briefly, in a first aspect the invention comprises a system for supplying power to a field winding to maintain excitation of an alternating current generator during excessive output current conditions, the generator having a plurality of output lines for supplying power to a load and the field winding being supplied during normal operating conditions by a shunt type voltage regulator responsive to the output voltage of the generator. The boost system comprises a current transformer having a primary winding in series with an output line of the generator, a secondary winding, and a tertiary winding shunted by a capacitance. A rectifying circuit rectifies the voltage supplied by the secondary winding, the output terminals of the rectifying circuit being connected in series with the regulator output terminals to supply power to the field winding. A control circuit, connected to the output of the generator and responsive to output current conditions, enables the rectifying circuit outputs during excessive output conditions. The rectifier outputs are disabled by the control circuit in the absence of excessive output current conditions, whereby power from the rectifiers is supplied to the field winding only when an excessive output current condition exists.

In a second aspect, the invention comprises a current transformer circuit having a primary winding electrically connected in series with a load circuit through which a load current flows and a secondary winding connected to an output circuit. The output circuit includes elements having predetermined voltage ratings. Circuitry, including a tertiary winding, limits the voltage across the secondary winding to a level generally below the predetermined voltage ratings of the elements of the output circuit to protect the circuit elements. The primary winding is coupled to the secondary and tertiary windings only by electromagnetic induction.

In a third aspect, the invention comprises a boost system for supplying power to a field winding to maintain excitation of an alternating current generator during excessive output current conditions, the generator having a plurality of output lines for supplying power to a load and the field winding being supplied during normal operating conditions by a shunt type voltage regulator responsive to the output of the generator. The boost system comprises a current transformer having a primary winding in series with an output line of the generator, a secondary winding, and a tertiary winding shunted by a capacitance. The primary winding is coupled to the secondary and tertiary windings only by electromagnetic induction. The voltage supplied by the secondary winding is rectified, the output terminals of the rectifier being connected in series with regulator output terminals.

In a fourth aspect, the invention comprises a boost system for supplying power to a field winding to maintain excitation of a multi-phase alternating current generator during excessive output current conditions. The generator has a plurality of output lines for supplying power to a load and the field winding is supplied from a shunt type voltage regulator responsive to the output voltage of the generator during normal operating conditions. The boost system comprises a sense and boost circuit for sensing the current in each of the generator output lines and for impressing a voltage on the field winding during excessive output current conditions. The magnitude of the impressed voltage is substantially proportional to the number of generator output lines in which an excessive output current is flowing and is sufficient to maintain the excitation of the generator during the excessive output current conditions. A voltage regulator disabling circuit, responsive to the outputs of the sense and boost circuit, disables the regulator when the currents in the generator output lines are not substantially equal during excessive output current conditions, thereby halting the supplying of power from the regulator to the field winding. The excitation of the generator is thus solely a function of the number of lines in which excessive output current flows.

In a fifth aspect, the invention comprises a boost system for boosting the power supplied to a field winding to maintain excitation of an alternating current generator during excessive output current conditions. The generator has a plurality of output lines for supplying power to a load and the field winding normally is supplied by a shunt type voltage regulator which regulates the excitation of the generator and the generator voltage according to a predetermined function of the generator voltage and generator frequency. The boost system comprises a circuit for boosting the field of the field winding during an excessive output current condition by impressing a voltage sufficient to maintain excitation of the generator upon the field winding during said condition. A control circuit enables the boosting circuit on a decrease in generator voltage indicative of an excessive output current condition except when the decrease in generator voltage is accompanied by a change in generator frequency which substantially corresponds to the predetermined function of the generator voltage and generator frequency. The boost system does not boost the power to the field winding when the voltage regulator reduces the excitation of the field winding due to a change in generator frequency.

Other objects and features will be in part apparent and in part pointed out hereinafter.

BRIEF DESCRIPTION OF THE DRAWINGS

FIG. 2 is a schematic of three current transformer circuits for the system of FIG. 1;

FIG. 3 is a graph of the input ampere-turns/output voltage characteristic of the current transformer circuits of FIG. 2;

FIG. 6 is a schematic of a regulated voltage supply circuit and timer circuit of the system of FIG. 1; and FIGS. 7 and 8 together are a circuit diagram of a boost system control circuit of the system of the present invention.

Corresponding reference characters indicate corresponding parts throughout the several views of the drawings.

DESCRIPTION OF A PREFERRED EMBODIMENT

Figure 1:
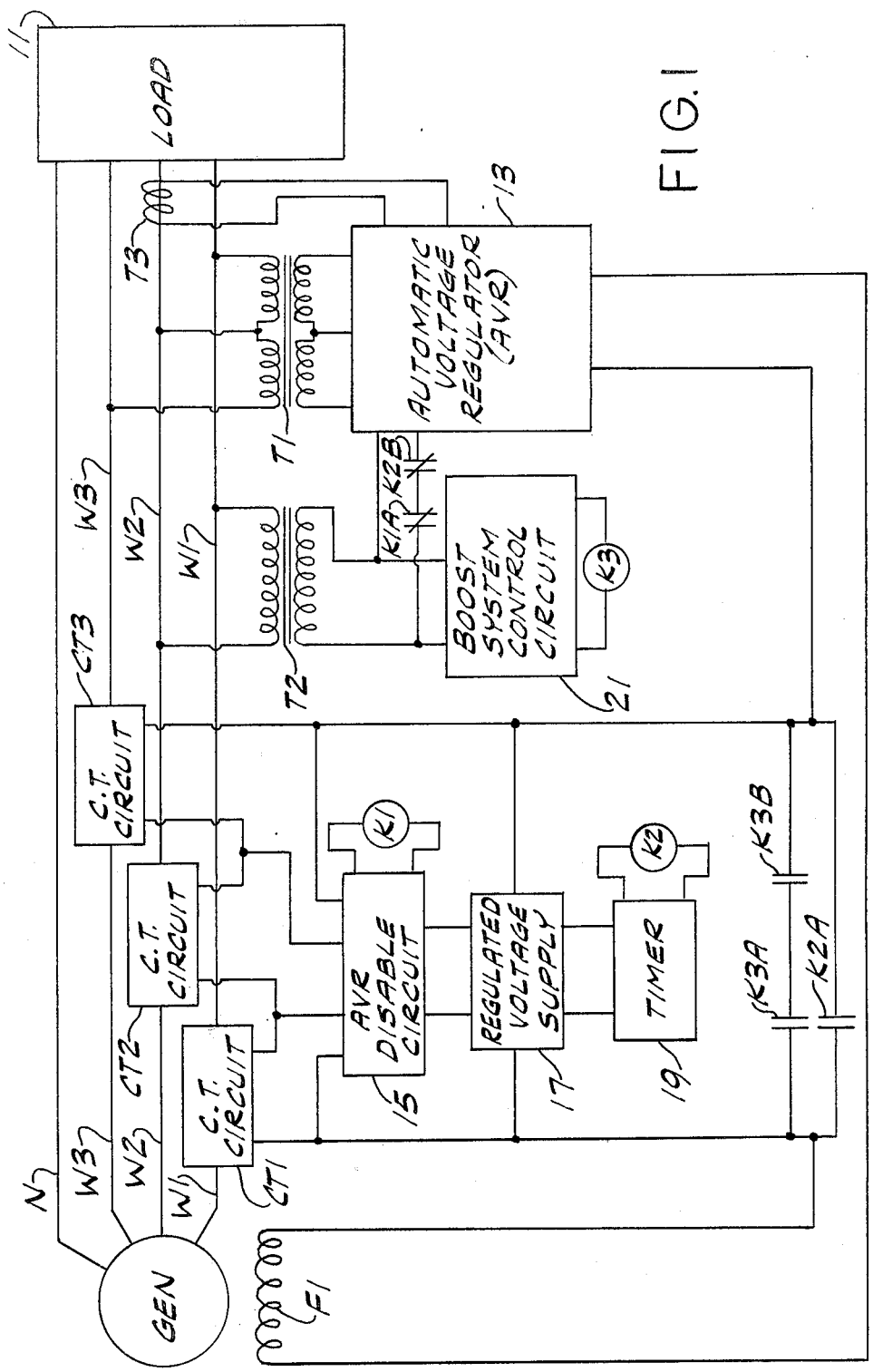
FIG. 1 is a block diagram schematic of a system of this invention connected to a three-phase generator and an automatic voltage regulator.

Referring to FIG. 1 of the drawings, a three-phase generator GEN with a neutral conductor N delivers power to a load 11 via three output lines W1, W2, and W3. The alternating current generator is excited by field winding F1 which is supplied with direct current during normal operating conditions by a shunt-type automatic voltage regulator (AVR) 13, responsive to the output voltage of the generator. The AVR senses the output voltage and frequency of the generator via a multi-phase transformer T1. Alternatively, a single-phase transformer can be used in place of transformer T1, in which case the frequency and output voltage across only two of the lines, e.g., lines W1 and W3, is sensed. The AVR receives power from one line-to-line phase of the generator via a single-phase transformer T2 connected to lines W1 and W2. The AVR senses the load current of line W2 via a current transformer T3 for droop compensation purposes. The output of the AVR provides excitation power for the generator field winding, either directly or via an exciter, regulating the output voltage of the generator according to a predetermined function of the generator voltage and generator frequency. The output of the AVR shown results in a generator output voltage which is proportional to the square of the generator frequency at frequencies in the vicinity of 60 Hz. Of course, the AVR need not have this particular characteristic. AVRs having other frequency response characteristics, such as would result in a generator output voltage generally proportional to frequency, or generally independent of frequency, could also be used.

The boost system (see FIG. 1) comprises three current transformer circuits CT1, CT2 and CT3 connected to lines W1, W2 and W3 respectively to provide three rectified output voltages, each voltage being proportional to the current in the line to which its transformer circuit is connected up to the point at which the respective transformer becomes saturated. The output terminals of CT1, CT2 and CT3 are connected in series and that series combination is in series with the output terminals of the AVR and the input terminals of field winding F1. The current transformer assemblies constitute sense and boost means for sensing the current in each of the generator output lines and for impressing a voltage on the field winding during excessive output current conditions whose amplitude is substantially proportional to the number of generator output lines in which an excessive output current is flowing. The impressed voltage is sufficient to maintain the excitation of the generator during a number of different excessive (abnormal) output current conditions, including faults, overloads, and while starting large motors.

The output terminals of circuits CT1, CT2 and CT3 are connected to the input terminals of a circuit 15, hereinafter referred to as the AVR disable circuit, for enabling and disabling automatic voltage regulator 13. This circuit disables the AVR whenever the boost system is operating (impressing a voltage on the field winding) and the currents in the three output lines of the generator are unbalanced. As stated above, since the AVR receives power from only two of the three output lines of the generator, the response of the AVR to an unbalanced line current condition is somewhat unpredictable. AVR disable circuit 15 eliminates this unpredictable situation by disconnecting the AVR from the power lines when the currents in the lines are unbalanced. Specifically, in such a situation circuit 15 energizes a relay coil K1, which opens a set of normally closed contacts K1A to disconnect transformer T2 from the AVR, thereby de-energizing the AVR by removing its source of power. In some situations (not shown), suitable voltages for the AVR are available directly from the generator windings. In these cases, transformer T2 is not needed and disable circuit 15 disconnects the AVR from the power inputs of the generator, thereby deenergizing the AVR. Circuit 15 disables the AVR only when the line currents are unbalanced. When all the line currents are normal the AVR provides the only excitation of the field and must not be disabled; when all the line currents are excessive (i.e., when the generator output voltage drops significantly) the AVR has no significant output and therefore need not be disabled.

A regulated voltage supply 17 is connected across the series combination of current transformer circuits CT1, CT2 and CT3, providing a 24 V supply for AVR disable circuit 15 and for a timer 19 when the regulated supply receives power from the current transformer circuits.

Timer 19 controls the length of time the boost from the current transformer circuits is continued. Its purpose is to maintain excitation long enough for external protective devices to clear an overload but to shut down the system before the generator is damaged. If the fault is not cleared within a predetermined time interval after the boost is initiated, the timer energizes a relay coil K2, which closes a set of relay contacts K2A across the current transformer circuits' outputs, shorting out the boost from the current transformer circuits, and opens another set of relay contacts K2B which disconnects the power to the AVR from transformer T2. When contacts K2A close and K2B open, field winding F1 is no longer excited and the generator is de-energized. The relay comprising coil K2 and contacts K2A, K2B becomes mechanically latched when energized and must then be manually reset. The preferred time interval of the timer can be adjusted from approximately three to forty-five seconds.

Further control of the boost supplied by the current transformer circuits is provided by a boost system control circuit 21 which is connected to the output of transformer T2, and which monitors the output voltage of the generator. Control circuit 21 drives a relay coil K3 which controls a pair of series-connected normally open relay contacts K3A and K3B connected across the series combination of CT1, CT2 and CT3. Control circuit 21, relay coil K3, and contacts K3A, K3B constitute means, connected to the output of the generator and responsive to output current conditions, for enabling the outputs of the current transformer circuits during excessive output current conditions and for disabling the outputs in the absence of excessive output current conditions, whereby power is supplied to the field winding only when an excessive output current condition exists. Of course, since control circuit 21 monitors the output voltage of the generator, it is responsive not only to excessive output current conditions (which cause the voltage to be low) but also to any other condition (such as startup of the generator) which results in a low output voltage. Opening contacts K3A and K3B enables the output of the series-connected current transformer circuits, which then boosts the power supplied to the field. The boost system control circuit monitors the voltage/frequency characteristic of the line-to-line phase to which it is connected. If a drop in voltage is accompanied by a drop in frequency and is no greater than expected because of the $f^2$ characteristic of the AVR, the boost is not enabled, otherwise, a significant drop in voltage causes control 21 to enable the boost.

On start-up of the system of FIG. 1, rotation of the generator by a prime mover produces a small generator output voltage due to residual magnetism in the field winding. Contacts K1A and K2B are closed so that the AVR provides an excitation voltage for the field winding. Control circuit 21 senses the low generator voltage during start-up and causes contacts K3A and K3B to be open to enable the boost system by allowing the current transformer circuits to deliver power to the field winding. Of course, if there is no load on the generator, the output of the current transformer circuits will be negligible. (Timer 19 begins to clock at this time.) Assuming the line currents are balanced, AVR disable circuit 15 will not energize relay coil K1, and the AVR operates. With the increased field excitation caused by the boost system when the generator has a load, the generator quickly delivers rated voltage, well before the end of the time interval of timer 19. In other words, the predetermined time interval of the timer is of sufficient length to permit start-up of the generator. When the control circuit senses that the generator has substantially reached operating voltage, coil K3 is energized, closing contacts K3A and K3B. The boost system is thereby disabled.

If, during operation of the generator, the line-to-line voltage between lines W1 and W2 falls due to an excessive output current condition such as a fault or overload (while the frequency of the alternating current does not change, for example), control circuit 21 opens contacts K3A and K3B. Then the sum of the voltages provided by the three series connected current transformer circuits CT1, CT2, CT3 and the AVR is applied to generator field winding F1, assuming balanced line currents. (However, the AVR has little if any output voltage during such conditions.) When contacts K3A and K3B are open, regulated voltage supply 17 is no longer shorted out and it supplies power to AVR disable circuit 15 and timer 19. Once actuated, the timer will begin to clock its 3-45 second time period to allow sufficient time for breakers to clear the fault. Unless the timer is de-energized prior to the end of this time period, it will energize coil K2 at the end of the period, thereby closing contacts K2A to disable the boost system by shunting out the current transformer circuits and opening contacts K2B to disconnect the AVR. In this case, field winding F1 is de-energized and the generator ceases to produce power.

On the other hand, if the fault on the line or lines causing the excessive current condition is corrected prior to the end of the time period, the generator will again produce its rated voltage. Control circuit 21, upon sensing this normal voltage level, causes contacts K3A and K3B to close, turning off regulated supply 17 to shut down timer 19 after a predetermined delay time interval. De-energization of the timer longer than the predetermined delay time interval stops its timing and resets it; it then cannot stop excitation of the field. Upon later re-energization of the timer, it will begin timing at the beginning of the time interval. The predetermined delay time interval is set by a delay capacitor in the timer which prevents the timer from resetting for a short period after the voltage becomes normal. The purpose of this delay is to permit the timer to disable the boost system even if the system falls into a sequence of rapidly cycling on and off.

If, during operation of the generator, the AVR senses that the generator is operating at a lower than normal frequency and adjusts the voltage downward correspondingly, the lower voltage does not trigger the boost system into operation. However, control circuit 21 energizes coil K3 if a sensed decrease in generator output voltage is not accompanied by a sensed decrease in generator frequency substantially corresponding to the voltage/frequency transfer characteristic of the AVR.

Current Transformer Circuit

Referring to FIG. 2, current transformer circuits CT1, CT2 and CT3 are substantially identical. Each current transformer circuit includes a ferromagnetic iron core current transfomer T4 having a primary winding 23, a tapped secondary winding 25, and a tertiary winding 27. The primary of each is connected in series with an output line of three-phase generator GEN, the output line constituting a load circuit through which a load current flows. Each of circuits CT1, CT2, and CT3 includes a diode bridge rectifier CR1 connected to the transfomer secondary constituting means for rectifying the voltage supplied by the secondary. The bridge rectifier outputs are the outputs of the current transformer circuits. They are connected in series with each other and the AVR output terminals to supply power to the field winding. In addition outputs of the individual bridge rectifiers are available on four terminals J1, J2, J3 and J4. Each current transformer's tertiary winding is shunted by a capacitance or capacitor C1, each tertiary winding and capacitance C1 forming a closed loop. The primary winding is coupled to the secondary and tertiary windings only by electromagnetic induction.

The output of each current transformer circuit increases substantially linearly with its respective phase current up to a predetermined level, and at greater levels of current becomes nearly constant, as shown in the graph of FIG. 3. The characteristics of primary winding 23 relative to the core characteristics are such that the core becomes saturated upon the load current exceeding a magnitude greater than one half the magnitude of a predetermined short circuit current, whereby the secondary winding supplies a nearly constant voltage over a wide range of abnormal current conditions to maintain excitation of the generator.

The usual and desired level of short circuit current is 3 times rated full load current ($I_R$), so the ampere-turn input ($AT_{IN}$) to current transformer T4 under short circuit conditions is:

$$AT_{IN} = 3I_R N_P,$$

where $N_P$ is the number of turns on primary winding 23. For design purposes, it is assumed that roughly 40% of the ampere-turn input is induced into secondary winding 25. That is, the ratio of the ampere-turns of the secondary winding to the ampere-turns of the primary winding is approximately 2:5. The ampere-turn-output of the secondary is the product of the short circuit current supplied to the field ($I_{FSC}$) from the secondary and the number of turns on the secondary winding ($N_S$). Thus:

$$I_{FSC} N_S = (0.40)(3) I_R N_P,$$

or, rearranged:

$$\frac{N_S}{N_P} = \frac{1.2 \, I_R}{I_{FSC}}$$

The ratio of the voltages in the secondary and tertiary under short circuit conditions is:

$$\frac{N_T}{N_S} = \frac{V_{CSC}}{V_{FSC/3}},$$

where $N_T$ is the number of turns on the tertiary, $V_{FSC}$ is the voltage applied to the field winding from the three secondary windings, and $V_{CSC}$ is the voltage applied to capacitor C1 by the tertiary. If a capacitor having a 300

V maximum operating voltage is chosen, under short circuit conditions $$\frac{N_T}{N_S} = \frac{300}{V_{FSC}/3},$$

if the 300 V level is not to be exceeded.

The use of a capacitor at the secondary whose reactance at the frequency of the alternating current is approximately 1.3 times the resistance of the field winding ($R_F$) referred to the tertiary winding reduces the peak voltages on the diodes of bridge CR1 sufficiently to protect them. Therefore the tertiary winding and capacitor C1 constitute means for limiting the peak voltage across the secondary winding to a level generally below the predetermined voltage ratings of the rectifiers CR1 to protect its diodes. Thus $$X_C = \frac{1}{2\pi f C} = \frac{1.3 R_F}{3} \text{ (one phase); or}$$

$$C = \frac{3}{1.3 R_F 2\pi f} = \frac{6120}{R_F}, \text{ at 60 Hz.}$$

Referring this impedance from the secondary to the tertiary:

$$C = \frac{6120}{R_F} \frac{N_S}{N_T}$$

The voltage applied to the field by the current transformers' secondaries under short-circuit conditions ($V_{FSC}$) can be expressed as a function of the product of the cross-sectional area of the transformer core ($A_C$) and primary turns ($N_P$):

$$A_C N_P = \frac{V_{FSC}}{.8} \frac{N_P}{N_S}.$$

Since $N_P/N_S$ and $V_{FSC}$ are known, $A_C$ and $N_P$ can be chosen. Then $N_S$, $N_T$ and C can be calculated.

The tertiary winding preferably has a resistance in the range of 3-7% (approximately 5% in the embodiment shown) of the reactance of the capacitor at the frequency of the alternating current:

$$R = \frac{.05}{2\pi f C}$$

It may be necessary to connect a resistor in series with capacitor C1 in order to provide the desired resistance.

AVR Disable Circuit

Figure 4:
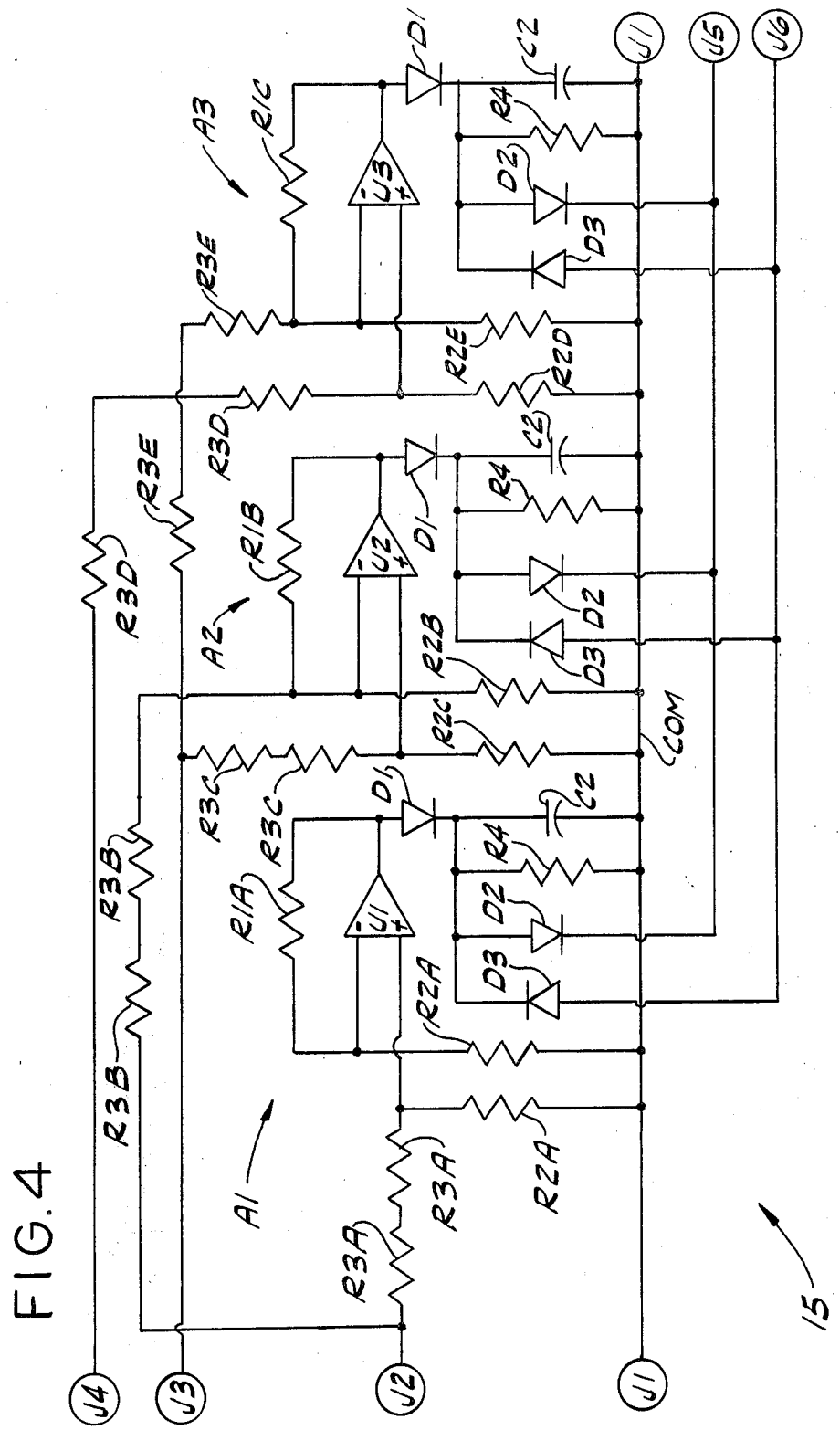
FIGS. 4 and 5 together are a schematic of an automatic voltage regulator disable circuit of the system of this invention.

AVR disable circuit 15 (FIGS. 4 and 5) is connected to current transformer circuits CT1, CT2 and CT3 via terminals J1-J4. Circuit 15 monitors and compares the voltages produced by the three current transformer circuits and together with relay coil K1 and contacts K1A constitutes means, responsive to the outputs of transformer circuits CT1, CT2 and CT3, for disabling the AVR when the currents in the generator output lines are not substantially equal during excessive output current conditions. It ceases the supply of power from the AVR to the field winding whenever excessive line current flows in at least one but less than all the lines, that is, when the line currents are unbalanced. Thus, circuit 15 assures that the excitation of the generator is solely a function of the number of output lines in which excessive output current flows and is independent of the particular output line of the generator affects by an excessive current condition.

More specifically, circuit 15 includes three substantially identical amplifier subcircuits, designated generally A1, A2 and A3. Subcircuit A1 includes an operational amplifier (op amp) U1 configured as a non-inverting scale changer with a feedback resistor R1A connected from the op amp output to the inverting input and two resistors R2A connected from each input to a common COM, which is connected to terminal J1. The non-inverting input of op amp U1 is connected through two resistors R3A to the output of transformer circuit CT3 via terminal J2. The output of op amp U1 is a scaled down voltage proportional to the output voltage of circuit CT3.

Amplifier subcircuit A2 includes an op amp U2 configured as a differential amplifier. Its inverting input is connected through two resistors R3B to terminal J2, through a resistor R2B to common, and through a resistor R1B to its output. Its non-inverting input is connected to terminal J3 by two input resistors R3C and through a resistor R2C to common. The output of op amp U2 is a scaled down voltage proportional to the output voltage of transformer circuit CT2 alone, the output of op amp U2 being substantially the same as the output of op amp U1 when the currents flowing in the primaries of current transformer circuits CT3 and CT2 are substantially the same. Likewise, the op amp of amplifier subcircuit A3, labelled U3, is configured as a differential amplifier with its inverting input connected via two resistors R3E to terminal J3 and its non-inverting input connected to terminal J4 by two resistors R3D. Terminals J3 and J4 represent the output terminals of current transformer circuit CT1. Thus, the output of op amp U3 is a scaled voltage proportional to the output voltage of transformer circuit CT1 alone. Its output is substantially the same as the outputs of op amps U1 and U2 when the currents flowing in the respective primaries are substantially the same.

In each amplifier subcircuit, the output of the op amp (U1-U3) is connected to the anode of a rectifier diode D1, whose cathode is connected to common by the parallel combination of a resistor R4 and a capacitor C2, which combination functions as a peak detector. The outputs of these peak detectors are approximately proportional to the currents flowing in their respective lines and thus these outputs can be compared to determine whether the line currents are balanced. The cathode of diode D1 is also connected to the anode of a diode D2 and the cathode of a diode D3. The cathode of diode D2 is connected to a reference terminal J5 which terminal seeks the voltage of the highest output of the three op amps, while the anode of diode D3 is connected to a reference terminal J6 which seeks the voltage of the lowest output of the three op amps.

Figure 5:
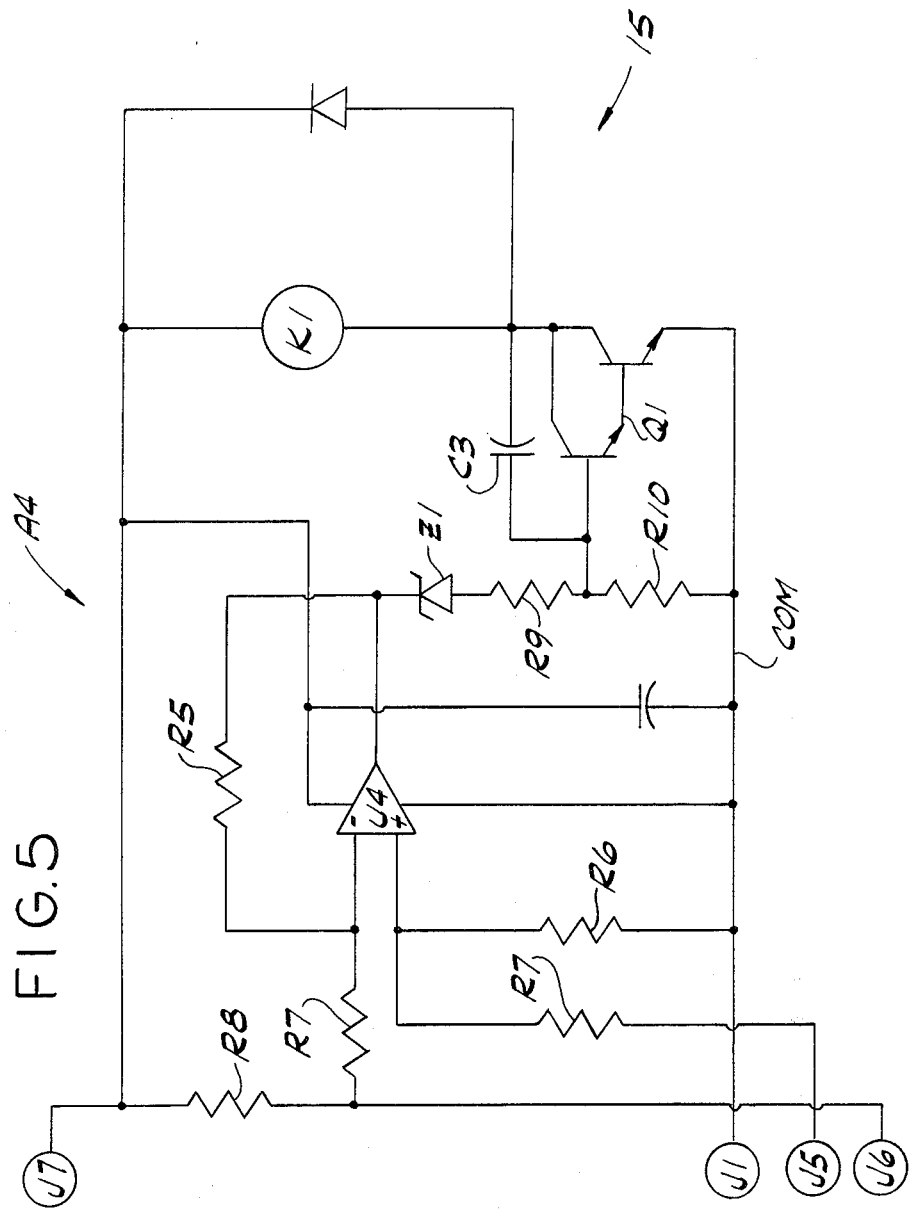

Referring now to FIG. 5, AVR disable circuit 15 includes a fourth amplifier subcircuit A4 including an op amp U4 configured as a differential amplifier. A feedback resistor R5 is connected from the output of op amp U4 to its inverting input and a referencing resistor R6 is connected from its non-inverting input to common COM (terminal J1). Input resistors R7 connect the non-inverting input of op amp U4 to high voltage reference terminal J5 and the inverting input to low voltage reference terminal J6. Terminal J6 is connected through a pullup resistor R8 (via a terminal J7) to the output of regulated voltage supply 17, described in detail hereinafter. The cathode of a 6.2 V zener diode Z1 is connected to the output of op amp U4. Its anode is connected by a base resistor R9 to the base of an npn Darlington pair transistor Q1, whose emitter is connected to common and whose collector is connected to relay coil K1. A feedback capacitor C3 connects the transistor collector to its base and a biasing resistor R10 connects the base to common.

In operation of the AVR disable circuit, power is supplied between terminals J1 and J7 by regulated voltage supply 17 when contacts K2A, K3A and K3B are open (see FIG. 1). Terminals J5 and J6 reflect the highest and lowest, respectively, of the voltages produced by the amplifier subcircuits, and the output of op amp U4 is proportional to this difference. If the output of op amp U2 exceeds a predetermined level determined by the 6.2 V breakdown voltage of zener diode Z1 in series with resistors R9 and R10, transistor Q1 conducts, energizing relay coil K1 to open contacts K1A and thereby disable the AVR. The zener breakdown voltage of diode Z1 and the amplification gain of amplifier subcircuits A1–A4 are chosen such that when a significant imbalance in line currents occurs the output of op amp U4 exceeds the breakdown voltage of diode Z1. Amplifier subcircuits A1–A4 constitute means for comparing the voltages produced by the current transformer circuits and zener diode Z1, transistor Q1 (and related circuitry), relay coil K1 and contacts K1A constitute means for disconnecting the AVR from the generator when the difference between the highest and lowest voltages exceeds a selected level.

Regulated Power Supply

Referring to FIG. 6, regulated power supply circuit 17 is supplied by current transformer circuits CT1, CT2, CT3 via terminals J1 and J4, terminal J1 being the circuit common COM. The power supply has ripple filtering elements including a parallel resistor R11 and diode D4 combination connected from terminal J4 to a capacitor C4, which is connected to common. The combination of diode D4, resistor R11 and capacitor C4 serves as an arc suppressor for relay contacts K3A and K3B connected across terminals J1 and J4 (see FIG. 1). One terminal of an inductor L1 is connected to terminal J4 and a capacitor C5 is connected from inductor L1 to common. The cathode of a 3 volt zener diode Z2 is connected to the common terminal of inductor L1 and capacitor C5 and the anode is directly connected to the base of a pnp transistor Q2 and to common by two dropping resistors R12. The emitter of transistor Q2 is tied to the cathode of diode Z2 by a limiting resistor R13 and its collector is connected to the base of an npn transistor Q3 and to the cathode of a 23 V zener diode Z3, whose anode is connected to common. Transistor Q2 acts as a constant current source for diode Z3. Transistor Q3 has its collector connected to the cathode of diode Z2 and its emitter to common by a bypass capacitor C6. The emitter of transistor Q3 provides a constant voltage supply of approximately 24 V at terminal J7 whenever a sufficient voltage is applied between terminals J1 and J4 by current transformer circuits CT1, CT2, and CT3 and contacts K2A, K3A and K3B are open.

Timer

Timer 19 permits the boost system to boost the field only for a predetermined time interval to allow time to clear a fault on a generator output line or to start-up the generator. The timer shuts down the boost and disables the AVR at the end of the time interval if the boost system is not first disabled, to prevent damage to the generator. Timer 19, shown with regulated voltage supply 17 in FIG. 6, is connected to terminal J7 and common of regulated power supply 17. In the timer, a diode D5 is connected with its anode to terminal J7 and with its cathode connected to a capacitor C7 and a resistor R14. Three series-connected 3–5.1 V zener diodes Z4, Z5 and Z6 connect resistor R14 to common, with the anode of diode Z6 being connected to common. An op amp U5 has its non-inverting input directly connected between zener diodes Z5 and Z6 and its inverting input connected between diodes Z5 and Z6 by the parallel combination of an input resistor R15 and a diode D6, whose anode is connected to the non-inverting input. A resistor R16 is connected from the inverting input to common. Another diode D7 is connected with its anode to the inverting input and its cathode to the output of op amp U5. A potentiometer R17 and resistor R18, connected in series, connect the output of op amp U5 to its non-inverting input, the wiper of potentiometer R17 being connected by a timing capacitor C8 to the inverting input of op amp U5. The output of op amp U5 is connected by a resistor R19 to the emitter of a pnp transistor Q4, whose base is connected to the reference point between zener diodes Z4 and Z5. The collector of transistor Q4 is connected to common by a resistor R20 and is directly connected to the gate of a silicon-controlled rectifier SCR1, whose cathode is connected to common and whose anode is connected to terminal J7 by relay coil K2. Contacts K2A and K2B (shown in FIG. 1) are mechanically latched when actuated by coil K2 and must be manually reset.

In operation of timer 19, when power is initially supplied by regulated voltage supply 17 output of op amp U5 slowly ramps positive at a rate controlled by timing potentiometer R17 and capacitor C8. If this output is allowed to continue to increase until it exceeds the voltage supplied at the cathode of zener diode Z5 (approximately 10 V), transistor Q4 conducts, causing silicon-controlled rectifier SCR1 to conduct and energize relay coil K2. On the other hand, if regulated supply 17 is de-energized before the end of the time period set by potentiometer R17 and capacitor C8, the output of op amp U5 returns to zero. Thus, the next time the regulated supply is energized, the output of op amp U5 must begin to increase from zero. Capacitor C7 provides a short time delay to prevent the timer from resetting when voltage supply 17 goes off for only a short time. This allows the timer to time out and disable the boost system in those cases where the boost system rapidly cycles on and off.

Boost System Control Circuit

Referring now to FIG. 7, boost system control circuit 21 includes a transformer T5 having a two-winding primary (for either 120 V or 240 V a.c. inputs) connected across the secondary of transformer T2 (see FIG. 1) for monitoring the voltage of one line-to-line phase of the generator output. The secondary of transformer T5 is connected to a capacitor-filtered, diode bridge rectifier, designated CR2, whose output is shunted by a series resistor R21 and a capacitor C9, capacitor C9 being connected to the negative side of bridge CR2, which is common COM. The base of an npn Darlington pair transistor Q5 is connected between resistor R21 and capacitor C9, its collector is directly connected to the positive side of rectifier CR2, and its emitter is connected to common by the series combination of a load resistor R22 and a 15 V zener diode 27, whose anode is connected to common. Alternatively, three 5.1 V Zener diodes could be used in place of diode Z7 to give an improved temperature coefficient. A filter capacitor C10 is connected from the emitter of transistor Q5 to common and two series-connected resistors R23 and R24 are in parallel with capacitor C10. This provides a 24 V regulated supply at a terminal J8. An npn transistor Q6 has its collector connected between resistor R21 and capacitor C9, its base connected between resistors R23 and R24 and its emitter between resistor R22 and diode Z7. This constitutes a 15 V supply at the cathode of the diode, which voltage appears on a terminal J11.

One of the supply inputs of the automatic voltage regulator (the output of transformer T2) is connected via a line L11 to a filter network 29 (see FIG. 7) comprising a resistor R25 connected to a capacitor C11 (which is connected to common) forming a first lowpass circuit, and a resistor R26 connected from between resistor R25 and capacitor C11 to a capacitor C12 (which is connected to common), forming a second lowpass circuit. The values of resistors R25, R26, and capacitors C11, C12 are chosen such that each lowpass circuit output rolls off at substantially 20 db/decade (substantially linearly) in the vicinity of 60 Hz. Together, the two circuits roll off at 40 db/decade at 60 Hz, as a function of the square of the frequency. In other words, the two filters constitute a filter network whose attenuation is proportional to the square of the generator frequency in the range of the normal generator frequency.

The output of filter network 29 (between capacitor C12 and resistor R26) is connected to common by a series combination of a potentiometer R27 and a resistor R28. A precision rectifier 31, constituting means for rectifying the output of filter network 29, is connected to the wiper of potentiometer R27. In the rectifier, an op amp U6 has its non-inverting input directly connected to common and its inverting input connected to the wiper of potentiometer R27 by an input resistor R29. A diode D8 shunts the two inputs. The anode of another diode D9 is connected to the output of op amp U6, the cathode of diode D9 being connected to the non-inverting input of a second op amp U7 and to the cathode of a diode D10, whose anode is connected to common. The non-inverting input of op amp U7 is connected to the wiper of potentiometer R27 by a resistor R30, while the inverting input is connected to the cathode of diode D8 by a resistor R31 and is connected directly to the output of op amp U7, which is designated terminal J9. Filter network 29 and precision rectifier 31 of the control circuit together constitute an analog circuit for continuously calculating a value indicative of the relationship of the generator voltage to the generator frequency. More particularly, the output of rectifier 31 is proportional to the output voltage of the generator and inversely proportional to the square of the generator frequency.

Figure 8:
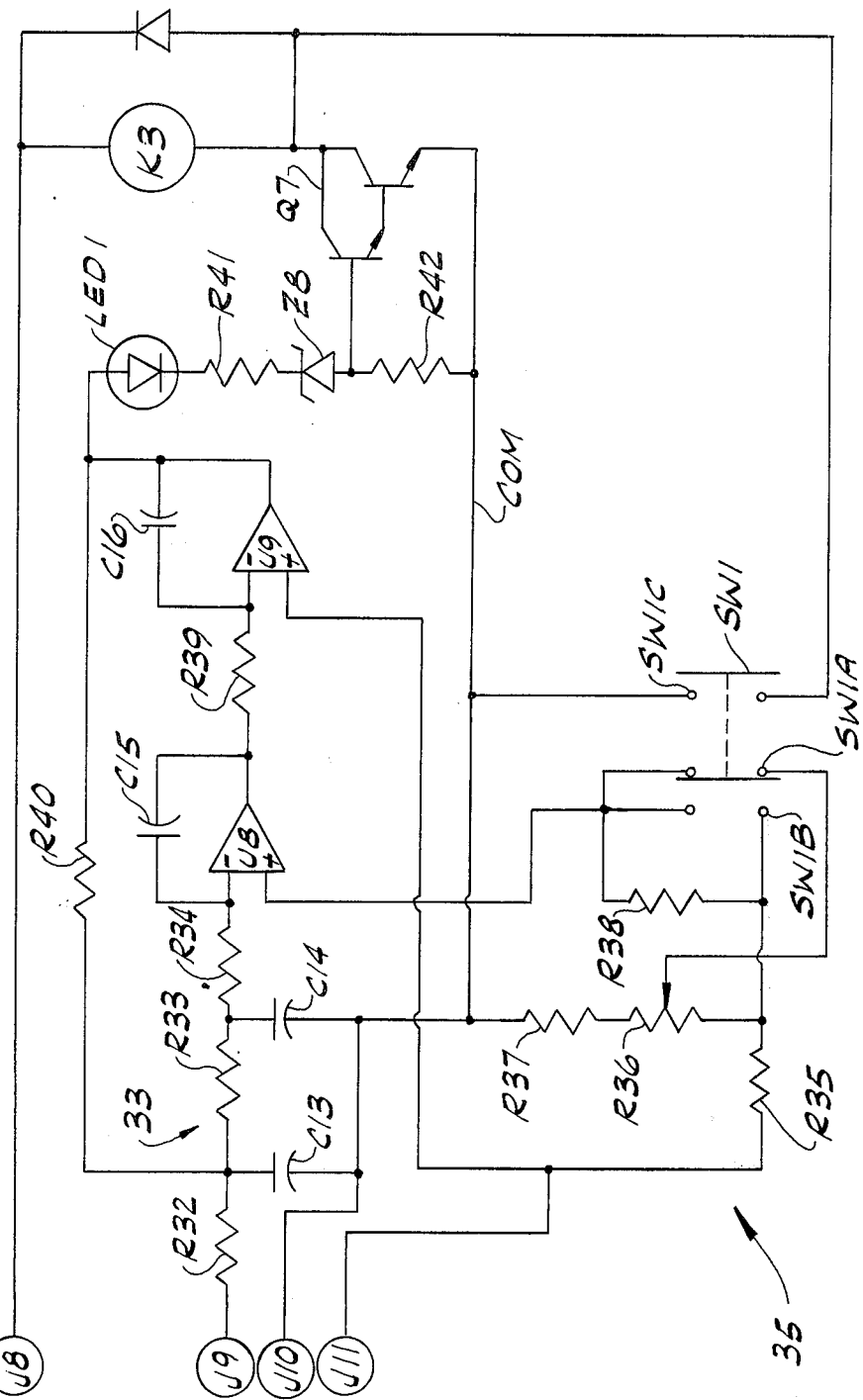

Referring now to FIG. 8, the output of the precision rectifier (terminal J9) is connected to a ripple filter 33 comprised of a series resistor R32, a shunt capacitor C13 to common COM (terminal J10), a series resistor R33, a shunt capacitor C14 to common, and a series resistor R34. An operational amplifier U8 functioning as a voltage comparator has its inverting input connected to resistor R34, the output of the ripple filter. The non-inverting input of op amp U8 is connected to a reference voltage circuit 35 comprising the series combination of a resistor R35, a potentiometer R36 (for calibration of the control circuit threshold voltage) and a resistor R37 between terminal J11 and common (terminal J10). A momentary contact switch SW1, for use in calibration, has one set of normally closed contacts SW1A, and two sets of normally open contacts SW1B and SW1C, contacts SW1A connecting the wiper of potentiometer R36 to the non-inverting input of comparator op amp U8. Contacts SW1B, shunt by a high resistance resistor R38, connect the clockwise end of potentiometer R36 to the non-inverting input of op amp U8 during calibration.

A capacitor C15 feeds back the output of op amp U8 to its inverting input. The comparator (including op amp U8) and related circuitry 35 comprise means for comparing the rectified output of filter network 33 with a selected voltage level and indicating when the rectified output exceeds the selected level, the level being selected as a threshold which indicates departure of the generator voltage from its normal functional relationship to the generator frequency. In other words, the comparator and related circuitry comprise means for comparing a value indicative of the actual relationship of the generator voltage and generator frequency (specifically $-V/f^2$) with a selected value corresponding to the predetermined function of the AVR.

The output of comparator op amp U8 is connected by an input resistor R39 to the inverting input of a second op amp U9. Op amp U9 functions as an inverter, having a feedback capacitor C16 connecting its output to its inverting input and having its noniverting input supplied with the 15 V reference from terminal J11. A resistor R40 connects the output of op amp U9 to the common terminal of resistor R32, capacitor C13, and resistor R33 of the ripple filter. A light-emitting diode LED1 has its anode connected to the output of inverter op amp U9 and its cathode connected by a resistor R41 to the anode of a 9.1 V zener diode Z8, whose cathode is connected to common by a biasing resistor R42. An npn Darlington pair transistor Q7 has its base connected between resistor R42 and diode Z8, its emitter connected to common, and its collector connected by relay coil K3 to the 24 V supply via terminal J8. The collector of transistor Q7 is also tied to common through contacts SW1C, so that transistor Q7 is bypassed during calibration when switch SW1 is pressed to keep the coil of relay K3 energized.

During calibration, potentiometer R27 (see FIG. 7) is adjusted so that diode LED 1 just goes out. This sets the threshold of the control circuit to match the operating voltage of transformer T2. Then, the slider of potentiometer R36 (FIG. 8) is set to the desired position (for example, 90 percent of the voltage at its clockwise end). Once switch SW1, the calibrate button, is released, relay K3 will de-energize and enable the boost whenever the sensed voltage drops to the desired fraction (in this example, 90%) of the operating voltage at which the unit was calibrated.

In operation of control circuit 21 shown in FIGS. 7 and 8, whenever the generator is operating (and lines W1 and W2 are not shorted together), power is supplied to circuit 21 via transformer T2 and a 24 V supply is provided across capacitor C10. Lowpass filter network 29 receives an unrectified a.c. voltage from generator output lines W1 and W2 via transformer T2. Since each of the two lowpass circuits of filter 29 has a frequency response which falls off linearly as a function of the frequency in the 60 Hz range, the voltage output of the filter falls off as the square of the frequency. Op amps U6 and U7 with associated elements precisely rectify the lowpass circuits' output, providing a d.c. voltage which remains substantially constant so long as the output of the generator at frequencies below 60 Hz is proportional to the square of the frequency. This d.c. level is ripple-filtered by filter 33. Op amp U8 with its associated elements compares the reference voltage at the wiper of potentiometer R36 to this filtered d.c. level, producing a logical low output whenever the d.c. level equals or exceeds the reference. When the d.c. level equals or exceeds the reference no boost is needed, since the generator output voltage, although below the normal level at 60 Hz operation, is at or above the desired level (as determined by the AVR) for operation at lower frequencies. Op amp U9 inverts the logic output of op amp U8. Thus, when the d.c. level exceeds the reference voltage, the output of op amp U8 is low and the output of op amp U9 is high, overcoming the 9.1 V breakdown of zener diode Z8. This causes LED1 to light and transistor Q7 conducts, energizing relay coil K3, which results in the closing of contacts K3A and K3B to disable the boost system. However, when the d.c. level falls below the reference level, which indicates that the generator output voltage has fallen more than in proportion to the square of the frequency, the output of op amp 9 goes low. This low reverse biases transistor Q7, relay coil K3 is de-energized and contacts K3A and K3B return to their open position, thereby enabling the boost system.

Summarizing, control circuit 21 senses the generator output voltage through transformer T2 and when the voltage output of the generator is sufficiently high, shorts the outputs of rectifiers CR1 to disable the boost. Control circuit 21 opens contacts K3A and K3B and thereby enables the boost on a decrease in generator voltage (low voltage of the generator) indicative of an excessive output current condition when the decrease in generator voltage is not accompanied by a change in generator frequency which substantially corresponds to the predetermined function of the generator voltage and generator frequency.

The disclosed invention provides an improved boost system for maintaining excitation of an alternator during excessive output current conditions. The alternator short-circuit current is limited to three times rated load by saturation of the current transformers, and the need for high voltage rectifiers is eliminated. The current boost system substantially maintains this desired short circuit current level regardless which of the phases are affected. The system does not defeat the protection of the alternator afforded by the frequency-responsive transfer characteristic of the AVR. The system also improves the dynamic performance of the alternator during motor starting operations.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for supplying power to a field winding to maintain excitation of an alternating current generator during excessive output current conditions, the generator having a plurality of output lines for supplying power to a load and the field winding being supplied during normal operating conditions by a shunt type voltage regulator responsive to the output voltage of the generator, the system comprising:
   a current transformer having a primary winding in series with an output line of the generator, a secondary winding, and a tertiary winding shunted by a capacitance;
   means for rectifying the voltage supplied by the secondary winding, the output terminals of the rectifying means being connected in series with the regulator output terminals to supply power to the field winding; and
   control circuit means, connected to the output of the generator, and responsive to output current conditions to enable the rectifying means output during excessive output current conditions, said rectifying means output being disabled by the control circuit means in the absence of excessive output current conditions, whereby power from the rectifying means is supplied to the field winding only when an excessive output current condition exists.

2. A system as set forth in claim 1 wherein the primary winding is coupled to the secondary and tertiary windings only by electromagnetic induction.

3. A system as set forth in claim 1 wherein the tertiary winding has a resistance in the range of 3-7% of the reactance of the capacitance at the frequency of the alternating current.

4. A system as set forth in claim 1 wherein the current transformer has a ferromagnetic core and the characteristics of the primary winding relative to the core characteristics are such that the core becomes saturated upon the load current exceeding a magnitude greater than one-half the magnitude of a predetermined short-circuit current, whereby the secondary winding supplies a nearly constant voltage over a wide range of excessive current conditions to maintain excitation of the generator.

5. A system as set forth in claim 1 wherein the reactance of the capacitance at the frequency of the alternating current is approximately 1.3 times the resistance of the field winding referred to the tertiary winding.

6. A system as set forth in claim 1 further comprising timing means for stopping supply of power to the field winding by the voltage regulator and rectifying means a predetermined time interval after the rectifying means output is enabled if the rectifying means output is not first disabled by the control circuit means by the discontinuance of the excessive current condition, the predetermined time interval being sufficient to permit clearing a fault on an output line.

7. A system as set forth in claim 6 further comprising means for monitoring the output voltage of the generator as a function of the output current conditions, wherein said control circuit means enables the rectifying means output when the output voltage of the generator is low, a low output voltage being present during excessive output current conditions and on start-up of the generator, and wherein the predetermined time interval of the timing means is sufficient to permit start-up of the generator.

8. A current transformer circuit comprising:

a primary winding electrically connected in series with a load circuit through which an alternating current supplying said load flows;

a secondary winding connected to an output circuit, said output circuit including elements having predetermined voltage ratings, the ratio of the ampere-turns of the secondary winding to the ampere-turns of the primary winding being approximately 2:5; and means, including a tertiary winding, for limiting the voltage across the secondary winding to a level generally below said predetermined voltage ratings to protect said circuit elements, the voltage limiting means includes a capacitance electrically connected in shunt with the tertiary winding and forming a closed loop therewith, said primary winding being coupled to the secondary and tertiary windings only by electromagnetic induction, the tertiary winding being coupled to the primary and secondary windings only by electromagnetic induction, said tertiary winding having a resistance in the range of 3–7% of the reactance of the capacitance at the frequency of the alternating current.

9. A system for supplying power to a field winding to maintain excitation of an alternating current generator during excessive output current conditions, the generator having a plurality of output lines for supplying power to a load and the field winding being supplied during normal operating conditions by a shunt type voltage regulator responsive to the output of the generator, the system comprising:

a current transformer having a primary winding in series with an output line of the generator, a secondary winding, and a tertiary winding shunted by a capacitance, the primary winding being coupled to the secondary and tertiary windings only by electromagnetic induction; and means for rectifying the voltage supplied by the secondary winding, the output terminals of the rectifying means being connected in series with the regulator output terminals.

10. A system as set forth in claim 9 wherein the tertiary winding has a resistance in the range of 3–7% of the reactance of the capacitance at the frequency of the alternating current.

11. A system as set forth in claim 9 wherein the current transformer has a ferromagnetic core and the characteristics of the primary winding relative to the core characteristics are such that the core becomes saturated upon the load current exceeding a magnitude greater than one-half the magnitude of a predetermined short circuit current, whereby the secondary winding supplies a nearly constant voltage over a wide range of excessive current conditions to maintain excitation of the generator.

12. The system as set forth in claim 9 wherein the reactance of the capacitance at the frequency of the alternating current is approximately 1.3 times the resistance of the field winding referred to the tertiary winding.

13. A system for supplying power to a field winding to maintain excitation of a multi-phase alternating current generator during excessive output current conditions, the generator having a plurality of output lines for supplying power to a load, the field winding being supplied from a shunt type voltage regulator responsive to the output voltage of the generator during normal operating conditions, the system comprising:

sense and boost means for sensing the current in each of the generator output lines and for impressing a voltage on the field winding during excessive output current conditions whose magnitude is substantially proportional to the number of generator output lines in which an excessive output current is flowing, said impressed voltage being sufficient to maintain the excitation of the generator during said conditions; and voltage regulator disabling means, responsive to the outputs of the sense and boost means, for disabling the regulator when the currents in the generator output lines are not substantially equal during excessive output current conditions, thereby halting the supplying of power from the regulator to the field winding, whereby the excitation of the generator is solely a function of the number of lines in which excessive output current flows.

14. A system as set forth in claim 13 further comprising control circuit means, connected to the output of the generator, and responsive to output current conditions to enable the sense and boost means during excessive output current conditions, said sense and boost means being disabled by the control circuit means in the absence of excessive output current conditions, whereby power from the sense and boost means is supplied to the field winding only when an excessive output current condition exists.

15. A system as set forth in claim 14 further comprising timing means for stopping the supply of power to the field winding by the voltage regulator and circuit means a predetermined time interval after the sense and boost means is enabled if the sense and boost means is not first disabled by the control circuit means by the discontinuance of the excessive current condition before the end of the time interval, the time interval being sufficient to permit clearing of a fault on an output line.

16. A system as set forth in claim 15 wherein the control circuit means further comprises means for monitoring the output voltage of the generator as a function of the output current conditions and wherein the control circuit enables the sense and boost means when the output voltage of the generator is low, a low output voltage being present during excessive output current conditions and on start-up of the generator, and wherein the predetermined time interval of the timing means is sufficient to permit start-up of the generator.

17. A system as set forth in claim 13 for use with a voltage regulator of type which regulates the excitation of the generator according to a predetermined function of the generator voltage and generator frequency, which further comprises control circuit means for enabling the sense and boost means on a decrease in generator voltage indicative of an excessive output current condition when the decrease in generator voltage is not accompanied by a change in generator frequency which substantially corresponds to said predetermined function of the generator voltage and generator frequency, the sense and boost means being normally disabled by the control circuit means, whereby the system does not boost the power to the field winding when the voltage regulator reduces the excitation of the field winding due to a change in frequency.

18. A system as set forth in claim 13, wherein the sense and boost means includes a plurality of current transformers, each current transformer having a primary winding in series with an output line of the generator and having a secondary winding.

19. The system as set forth in claim 18, wherein each current transformer has a tertiary winding shunted by a capacitance.

20. A system as set forth in claim 18 wherein the primary winding is coupled to the secondary and tertiary windings only by electromagnetic induction.

21. A system as set forth in claim 18 wherein each current transformer has a ferromagnetic core and the characteristics of the primary winding of each transformer relative to its core characteristics are such that the core becomes saturated upon the load current exceeding a magnitude greater than one-half the magnitude of a predetermined short circuit current, whereby the secondary winding of each transformer produces a nearly constant voltage over a wide range of excessive current conditions.

22. A system as set forth in claim 18 wherein the sense and boost means includes a plurality of rectifier means, one connected to the secondary winding of each of the current transformers, the outputs of the rectifier means being connected in series with each other, the voltage regulator and the field winding.

23. The system as set forth in claim 13, wherein the sense and boost means includes means for producing a plurality of voltages proportional to the currents in each of the output lines, and wherein the voltage regulator disabling means includes means for comparing the voltages produced by the sense and boost means and means for disconnecting the regulator from the output lines of the generator when the difference between the highest and lowest voltages produced by the circuit exceeds a selected level.

24. A system for boosting the power supplied to a field winding to maintain excitation of an alternating current generator during excessive output current conditions, the generator having a plurality of output lines for supplying power to a load, the field winding normally being supplied by a shunt type voltage regulator which regulates the excitation of the generator and the generator voltage according to a predetermined function of the generator voltage and generator frequency, the system comprising:
  means for boosting the field of the field winding during an excessive output current condition by impressing a voltage sufficient to maintain excitation of the generator upon the field winding during said condition; and
  control circuit means for enabling the boosting means on a decrease in generator voltage indicative of an excessive output current condition except when the decrease in generator voltage is accompanied by a change in generator frequency which substantially corresponds to said predetermined function of the generator voltage and generator frequency, whereby the system does not boost the power to the field winding when the voltage regulator reduces the excitation of the field winding due to a change in generator frequency.

25. The system as set forth in claim 24 wherein the control circuit means includes analog circuit means for continuously calculating a value indicative of the actual relationship of the generator voltage to the generator frequency, and means for comparing said value with a selected value corresponding to the predetermined function of the voltage regulator.

26. The system as set forth in claim 24 for use with a voltage regulator for which the voltage supplied to the field winding results in a generator output voltage which is proportional to the square of the generator frequency in the vicinity of the normal generator frequency, wherein the control circuit means includes:
  a filter network whose attenuation is proportional to the square of the generator frequency in the vicinity of the normal generator frequency;
  means for rectifying the output of the filter network; and
  means for comparing the rectified output of the filter network with a selected voltage level and for indicating when the rectified output exceeds the selected level, said selected level being a threshold which indicates departure of the generator voltage from its normal functional relationship to the generator frequency.

27. A system as set forth in claim 24 wherein the boosting means includes a current transformer having a primary winding in series with an output line of the generator and a secondary winding, and rectifier means connected to the secondary winding, the rectifier means output being connected in series with the voltage regulator and field winding.

28. A system as set forth in claim 27 wherein the control circuit means for the boosting means includes switching means for shorting the output of the rectifier means when said switching means is closed, the boosting means being enabled when the switching means is open.

29. A system as set forth in claim 27 wherein the current transformer has a tertiary winding shunted by a capacitance.

30. A system as set forth in claim 29 wherein the primary winding is coupled to the secondary and tertiary windings only by electromagnetic induction.

31. A system as set forth in claim 29 wherein the current transformer has a ferromagnetic core and the characteristics of the primary winding relative to the core characteristics are such that the core becomes saturated upon the load current exceeding a magnitude greater than one-half the magnitude of a predetermined short-circuit current, whereby the secondary winding supplies a nearly constant voltage over a wide range of excessive current conditions to maintain excitation of the generator.

32. A system as set forth in claim 24 further comprising timing means, responsive to said control circuit means, for stopping supply of power to the field winding by the boosting means and voltage regulator a predetermined time interval after the boosting means is enabled unless the boosting means is first disabled by the control circuit means by the discontinuance of the excessive current condition, the time interval being sufficient to permit clearing of a fault on an output line causing an excessive output current condition.

* * * * *